Nov. 22, 1949        H. W. COLLINS        2,489,121
APPARATUS FOR FORMING PIPE COVERING SECTIONS
Filed May 13, 1944        2 Sheets-Sheet 1
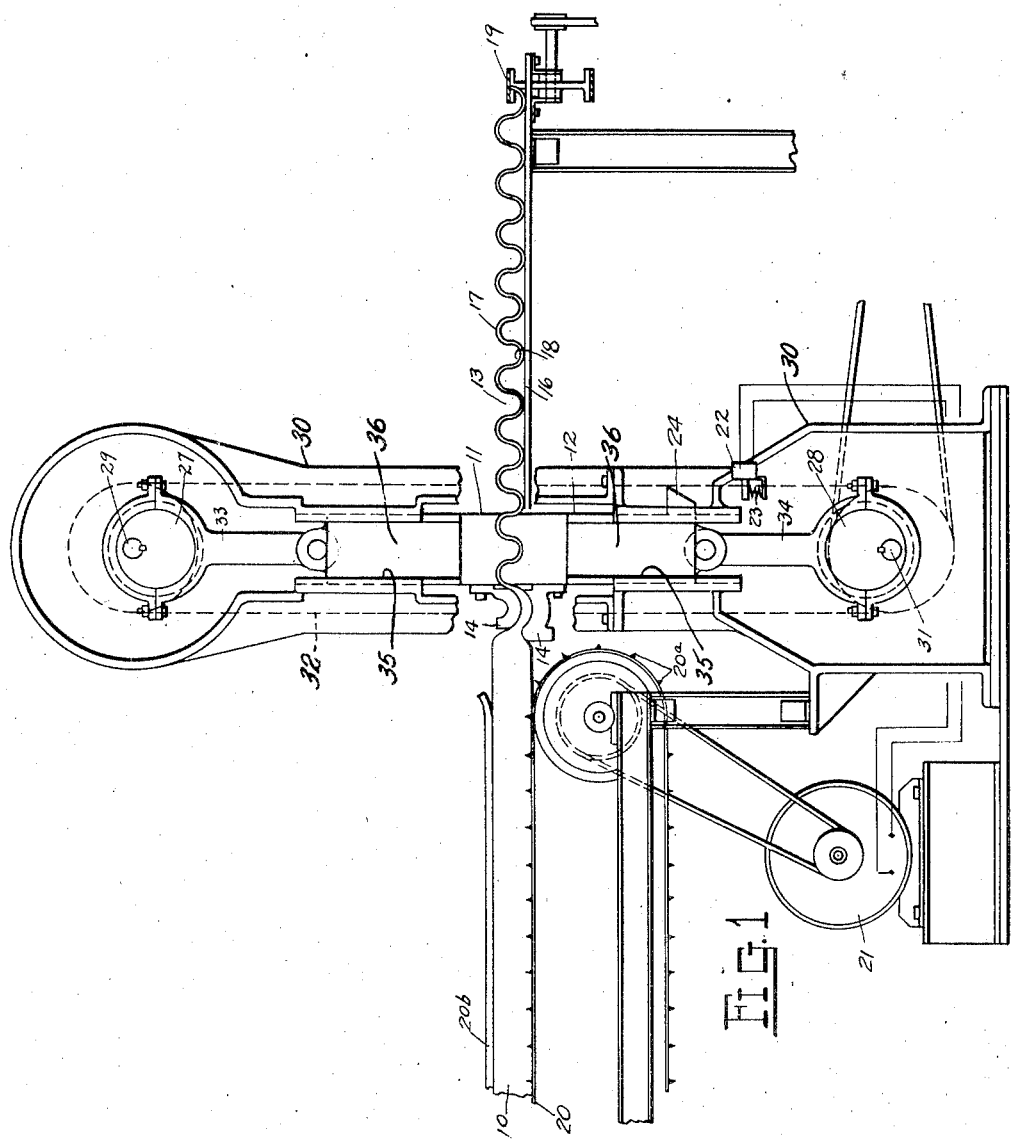
INVENTOR.
Howard W. Collins
BY
Staelin and Overman
Attorneys

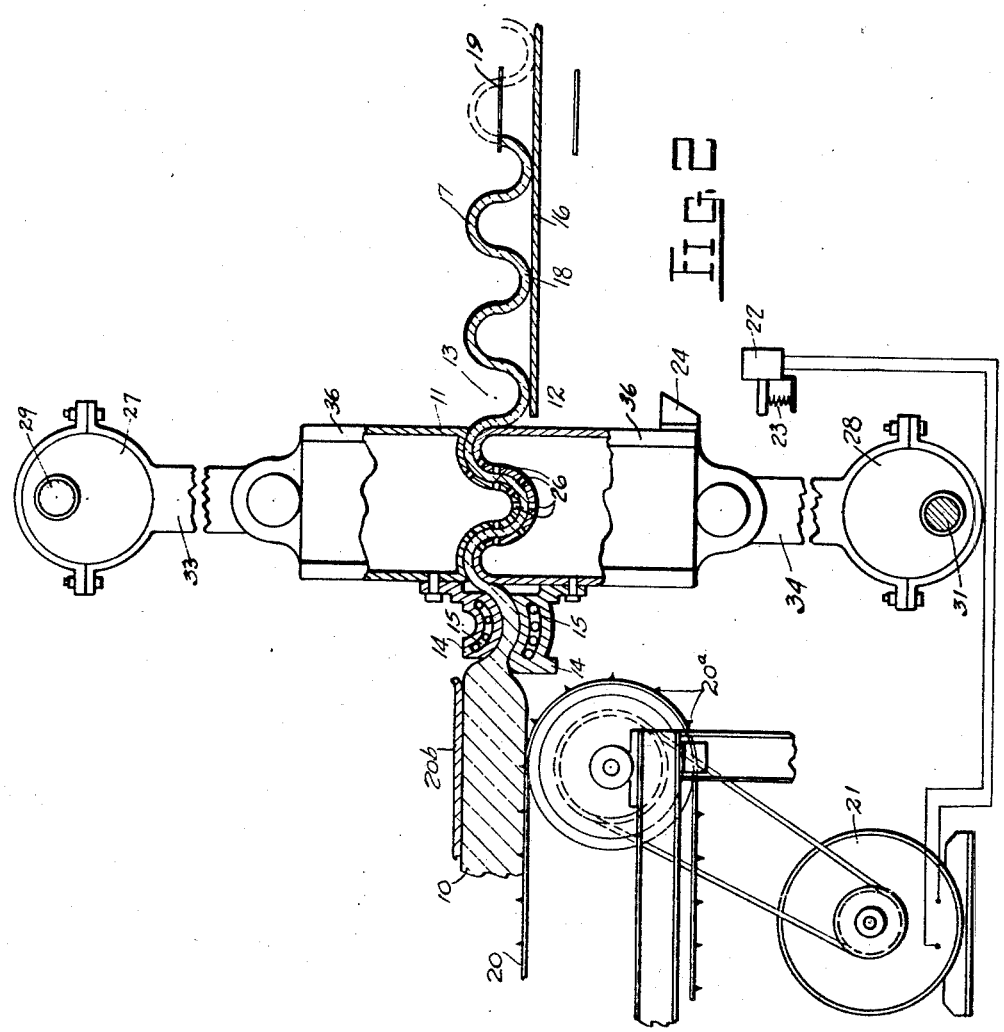

Patented Nov. 22, 1949

2,489,121

UNITED STATES PATENT OFFICE 2,489,121

APPARATUS FOR FORMING PIPE COVERING SECTIONS

Howard W. Collins, Newark, Ohio, assignor to Owens-Corning Fiberglas Corporation, a corporation of Delaware Application May 13, 1944, Serial No. 535,524

4 Claims. (Cl. 154—27)

The present invention relates to a method of and an apparatus for producing cylindrical pipe covering of insulating material such as fibrous glass.

It has been proposed to manufacture cylindrical pipe covering from a sheet or mat of insulating material by advancing the sheet between a pair of carriers having forming dies arranged to cooperate with one another to deform the sheet and impart a generally corrugated cross sectional contour to the sheet. The sheet is then severed medially thereof along a horizontal plane to separate the crest portions from the trough portions or, in other words, to produce a multiplicity of semi-circular complementary sections capable of being joined to form a cylindrical pipe covering. An example of such an apparatus is disclosed in the application of Atkinson and Collins, Serial No. 312,718, filed January 6, 1940, now Patent No. 2,350,996, dated June 13, 1944.

Although this process is highly satisfactory in producing pipe insulation on a production basis at relatively low cost, nevertheless, the apparatus required to carry out the several steps of this process is complicated in design and rather cumbersome in size. It follows, therefore, that the cost of the required equipment is rather high and this is especially true where it is desired to manufacture pipe coverings having a wide variety of sizes.

With the above in view, the present invention contemplates producing pipe covering at a high rate and at low cost with apparatus which is not only considerably more compact but which is also much simpler than the equipment required to carry out the various steps of the previously described process. Inasmuch as the apparatus is much simpler, it follows that pipe coverings of a wide variety of sizes may be readily produced with the minimum investment in equipment and plant space.

In addition to the above, it is an object of the present invention to obtain a uniform density of the insulating material as the latter is contoured to the required corrugated shape by exercising accurate control of the forming pressure applied to the sheet of insulating material by the corrugating dies.

A further object of this invention is to heat the insulating material at the same time it is compressed to the specified density so that the bonding agent previously dispersed through the relatively loose sheet of material will become hardened or cured.

A still further feature of this invention is to prevent premature setting of the bonding agent in the portion of the insulating material adjacent the entrant edges of the forming or corrugating dies by heat radiating from the dies.

The foregoing, as well as other objects of this invention, will be made more apparent as this description proceeds, especially when considered in connection with the accompanying drawing, wherein:

Figure 1 is a side elevational view of one type of apparatus which may be employed to carry out the several steps of the method of manufacture about to be described; and Figure 2 is a vertical longitudinal sectional view through a portion of the mechanism.

In general, the reference character 10 indicates a substantially continuous length or sheet of relatively loose mineral wool such, for example, as glass wool. The sheet 10 is impregnated with a suitable bonding agent selected from the groups which are characterized in that they dry or set and harden in the presence of heat. Bentonite or other clay, asphalt, pitch, resin such as phenol or urea formaldehyde, magnesium oxysulphate or the like are examples of binders that may be successfully employed, and the particular binder selected may be applied in the manner disclosed in the Simison and Collins Patent No. 2,189,840, dated February 13, 1940, or by the process disclosed in the Collins Patent No. 2,288,072, dated June 30, 1942, if desired.

The impregnated relatively loosely matted sheet is advanced step by step along a predetermined path of travel by means later to be described, and is compacted or compressed to the required density during the intervals of rest of the sheet by a pair of cooperating forming dies 11 and 12, respectively, supported at opposite sides of the path of travel of the sheet 10. The dies are mounted for relative movement toward and away from each other and are heated to a temperature sufficient to set or harden the bonding agent during the compressing phase of the operation. The adjacent faces of the dies are contoured to produce successive corrugations 13 in the sheet 10.

It is pointed out at this time that while the portion of the sheet 10 registering with the dies is heated sufficiently to set the binder therein, provision is made for cooling the portion of the sheet immediately adjacent the entrant sides of the dies to avoid premature setting of the binder in the uncompressed portions of the sheet by the heat radiating from the dies. In this connection, attention is directed to Figure 2 of the drawing wherein it will be noted that a shoe 14 is fixed to the entrant side of each die in a manner to cooperate with one another to partially compress the material therebetween as the dies are relatively moved toward each other. The sheet contacting surfaces of both shoes are shaped to form a partial corrugation in the portion of the sheet immediately adjacent the entrant sides of the dies so that the compressing action of the forming dies is reduced and a uniform density is more readily obtained. Each shoe 14 is formed with jackets 15 through which a cooling medium such, for example, as water is circulated and provision is made for insulating the shoes from the dies to prevent transference of heat therebetween.

The above construction is such that when the dies are moved toward each other during one interval of rest of the mat of insulating material 10, they engage the portion of the sheet which has previously been partially shaped by the cooling shoes 14 and compress this portion to the specified density. The dies simultaneously form the sheet to the final corrugated shape and are heated to permanently set the binder previously dispersed throughout the insulating material.

The corrugated portion of the sheet leaving the dies is supported by a platform 16 and the crest portions 17 of the corrugations are severed from the trough portions 18 by a suitable saw indicated in the drawing by the reference character 19. The teeth of the saw travel across the path of travel of the corrugated sheet in a horizontal plane midway between the planes including opposite sides of the sheet and, accordingly, the crest portions 17 are severed from the trough portions 18 during the intervals of advancement of the sheet. It is pointed out at this time that the increments of travel of the sheet 10 are predetermined so that adjacent crest portions 17 of the corrugations correspond exactly in size to the intervening trough portions 18. As a result, these portions may be used to form complementary halves of pipe insulation without resorting to such time consuming operations as trimming and fitting the sections.

In the embodiment of the invention selected for the purpose of illustration, (Figure 2), the sheet 10 is advanced by a conveyor 20 in the form of an endless belt driven by a suitable prime mover such, for example, as an electric motor 21. In order to insure positive movement of the mat 10 with the conveyor 20 and prevent relative slipping therebetween, teeth 20ª may be provided on the belt. A retaining plate 20ᵇ arranged to overlie the belt 20 provides a means for holding the mat in contact with the belt so that it is positively engaged by the teeth. Indexing of the conveyor and accordingly the sheet 10 is accomplished by a limit switch 22 normally held in its open position by a suitable spring 23 and electrically connected in series with the electric motor 21. The switch 22 is closed against the action of the spring 23 by a cam 24 fixed to the die 12 for movement as a unit with the latter. As shown in Figure 2 of the drawing, the cam has a tapered surface arranged to engage the switch in response to retracting movement of the dies and to hold the switch closed for a sufficient period to enable the sheet of insulating material 10 to complete one step of its travel relative to the dies.

In the relative positions of the parts shown in Figure 2 of the drawing, the switch 22 is held in its open position by the spring 23 and, as a result, the circuit to the electric motor 21 is broken. This circuit remains open until the dies are retracted sufficiently to clear the path of travel of the corrugated portion of the sheet at which time the switch 22 is closed to effect an advancement of the sheet relative to the dies. By the time the sheet completes one increment of travel, the dies have moved toward the sheet a sufficient distance to release the cam 24 from the switch, whereupon the switch opens under the action of the spring 23 to discontinue further movement of the sheet.

It follows from the above that the rate of travel of the sheet 10 by the conveyor is so timed with the speed of movement of the dies that the sheet 10 is advanced throughout its proper increment of travel before the dies actually returned into contact with the sheet. As a result, the sheet is stationary as the dies move into contact with opposite sides of the sheet and remains stationary throughout the forming operation.

It has been stated above that the portion of the sheet engaged by the dies is heated during the forming operation to a sufficient temperature to set or harden the binder which was previously dispersed through the fibrous sheet. As shown in Figure 2, the dies are of hollow construction to enable a heating medium such as hot air or steam to be introduced into each die and suitable perforations 26 are preferably formed in the contacting surfaces of the dies to permit the heating medium to pass into the fibrous material to cure, polymerize or otherwise render the same rigid.

In the present instance, the dies are relatively moved into and out of contact with the sheet 10 by two pairs of eccentrically mounted cams 27 and 28. The cams 27 are secured to a rotatable shaft 29 having the opposite ends journaled in suitable vertical supports 30 and driven at the required speed by any suitable mechanism not shown herein. The cams 28 are similarly secured to a rotatable shaft 31 also having the opposite ends respectively journaled in the supports 30 and connected to the shaft 29 by means of a driving chain 32 in such a manner that both shafts rotate at the same speed.

The cams 27 are spaced from each other axially of the shaft 29 and are respectively operatively connected to opposite end portions of the die 11 by suitable connecting rods 33. Similar connecting rods 34 serve to connect the cams 28 to opposite end portions of the die 12 and, as a result, both dies move in unison toward and away from the sheet 10. As shown, particularly in Figure 1 of the drawings, the dies are guided throughout their vertical travel by the supports 30. In detail, the supports 30 are formed with vertical slideways 35 and extensions 36 are formed on opposite ends of the dies. The extensions 36 respectively project into the slideways 35 and are slidably engaged thereby.

I claim:

1. In an apparatus for forming semi-cylindrical half-sections of a pipe covering from a sheet of fibrous material impregnated with a bonding agent adapted to harden in the presence of heat, separable cooperating forming dies each supported for movement toward and away from a position of cooperating relationship, means for automatically advancing a sheet of fibrous material between the dies, means for periodically moving the dies toward one another to compress the interposed fibrous sheet and to form successive corrugations in said sheet, means for heating the dies to cure the bonding agent in the fibrous sheet, jacket respectively carried by the dies at the entrant sides of the latter and responsive to movement of the dies toward each other to partially compress the material, and means for circulating a cooling medium through said jackets to avoid presetting of the bonding agent by the heat radiated from the dies.

2. Apparatus for forming semi-cylindrical half-sections of a pipe covering from a sheet of fibrous material impregnated with a bonding agent adapted to harden in the presence of heat, comprising cooperating forming dies each supported for movement toward and away from a position of cooperating relationship, means operable upon separation of said dies for advancing a sheet of fibrous material between the dies by a step by step movement, means for relatively moving the dies into and out of contact with the interposed sheet during the intervals of rest of the latter to produce successive crest and trough portions in the sheet, means for heating the dies to cure the bonding agent in the sheet, preforming dies carried by and movable together with said dies and engaging between them the fibrous material immediately adjacent the receiving side of the dies and shielding the material from the heat of the dies to avoid presetting the bonding agent in this latter portion of the sheet by the heat of the dies, and means for cooling the preforming dies.

3. In an apparatus for forming semi-cylindrical half-sections of a pipe covering from a sheet of fibrous material impregnated with a bonding agent adapted to harden in the presence of heat, cooperating forming dies each supported for movement toward and away from cooperative relationship, means for advancing a sheet of fibrous material between the dies, means for periodically relatively moving the dies toward one another to compress the interposed fibrous sheet and to form successive corrugations in said sheet, means for heating the dies to cure the bonding agent in the fibrous sheet, preforming dies at the entrant side of the dies and carried thereby for receiving between them the portion of the material immediately adjacent the entrant side of the dies to partially form a single corrugation in the sheet substantially to the contour of the forming dies, and means for cooling the preforming dies.

4. In an apparatus for forming semi-cylindrical half-sections of a pipe covering from a sheet of fibrous material impregnated with a bonding agent adapted to harden in the presence of heat, separable cooperating forming dies each supported for movement toward and away from a position of cooperating relationship, means for automatically advancing a sheet of fibrous material between the dies, means for periodically moving the dies toward one another to compress the interposed fibrous sheet and to form successive corrugations in said sheet, means for heating the dies to cure the bonding agent in the fibrous sheet, jackets respectively carried by the dies at the entrant sides of the latter and responsive to movement of the dies toward each other to partially compress the material, and means for cooling said jackets to avoid presetting of the bonding agent by the heat radiated from the dies.

HOWARD W. COLLINS.

REFERENCES CITED

The following references are of record in the file of this patent:

UNITED STATES PATENTS

| Number | Name | Date |
| --- | --- | --- |
| 1,321,517 | Frederick | Nov. 11, 1919 |
| 1,483,452 | Keyes | Feb. 12, 1924 |
| 1,519,742 | Tamberlin | Dec. 16, 1924 |
| 1,587,462 | Adams et al. | June 1, 1926 |
| 2,350,996 | Atkinson et al. | June 13, 1944 |
| 2,357,042 | Coss et al. | Aug. 29, 1944 |